Dec. 5, 1961   R. H. SKIDMORE   3,011,332
STATIC TORQUE MEASURING DEVICE
Filed Aug. 30, 1956

INVENTOR.
RICHARD H. SKIDMORE
BY
*Hyde, Meyer, Baldwin & Doran*
ATTORNEYS

United States Patent Office 3,011,332
Patented Dec. 5, 1961

3,011,332
STATIC TORQUE MEASURING DEVICE
Richard H. Skidmore, Cleveland, Ohio, assignor to John W. Wilhelm, Cleveland, Ohio
Filed Aug. 30, 1956, Ser. No. 607,144
2 Claims. (Cl. 73—1)

This invention relates to improvements in a static torque measuring device.

One of the objects of the present invention is to provide a static torque measuring device which is very compact, comprises a very small number of moving parts, and which will register a wide range of foot pounds of torque with almost no movement of the recording parts, whereby long life and great accuracy of the device is insured.

Other objects and advantages of the present invention will be apparent from the accompanying drawings and description and the essential features thereof will be set forth in the appended claims.

In the drawings,

FIG. 2 is a central sectional view through the device of FIG. 1; while

Figure 1:
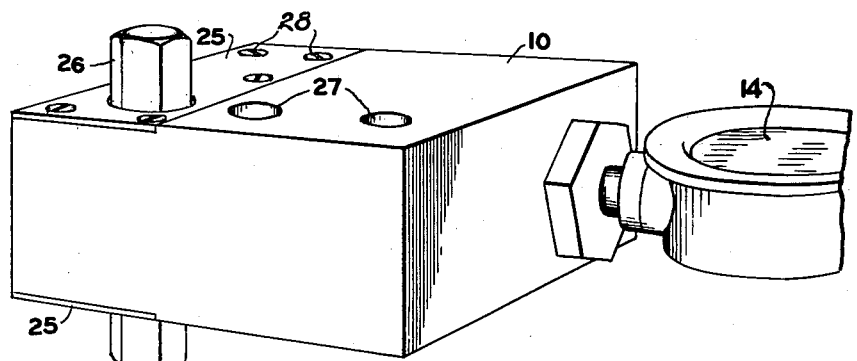
FIG. 1 is a perspective view of my device.

My invention is shown here as embodied in a very small but complete device formed of a single block of metal 10 having the approximate dimensions 3¾ inches by 2½ inches by 2⅛ inches. Such a small device is easily handled and several may be assembled on a plate to check a plural spindle nut runner where the bolt centers are very close together.

The preferred form of my invention utilizing a single block of metal 10 is very simply constructed. A cylindrical bore 11 is driven completely through the block along the longer dimension thereof and nearer one side thereof. In one form of my invention this bore is 1⅛ inches in diameter. One end of this bore is closed in a liquid tight manner by means of a pipe plug 12 or other suitable closure. This closure has a central opening or passage 13 extending axially therethrough and communicating with a passage 14a in a gage 14 adapted to read in terms of liquid pressure and provided with the usual Bourdon tube as the operating member of the gage for moving the recording hand 14b thereof. The particular gage shown reads up to 30 foot pounds of torque and is preferably calibrated directly to read foot pounds.

Figure 2:
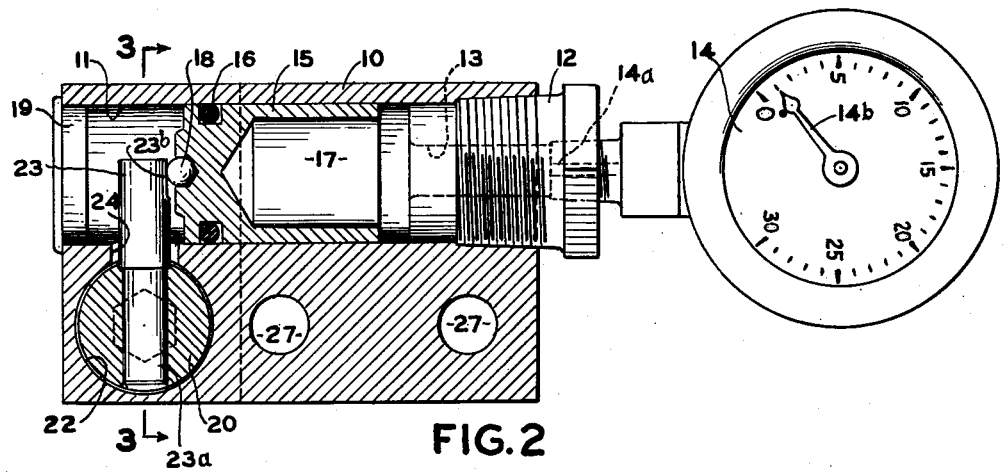
Figure 3:
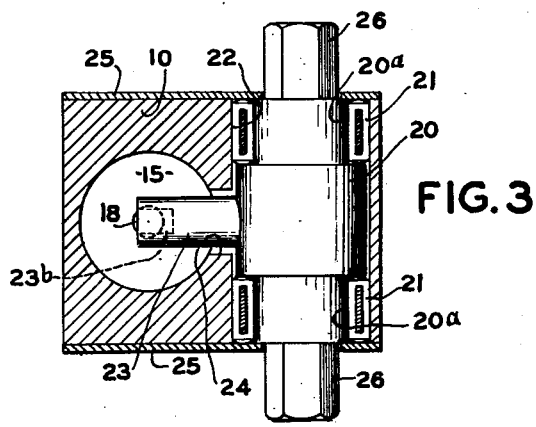
FIG. 3 is a sectional view taken along the line 3—3 of FIG. 2.

Snugly fitting in the bore 11 is a generally cylindrical piston 15 suitably sealed against the side walls of the bore against leakage as for instance by the rubber O-ring 16. It will be understood that when the gage is in operation, the chamber 17 between the piston and gage 14 is filled with a non-compressible liquid, such as oil or ethylene glycol, it being understood that this liquid fills the passages 13, 14a and the Bourdon tube of gage 14. On the outer face of piston 15 and extending axially therefrom is a hardened steel ball 18 pressed into a hole or recess 18a in the face of the piston providing a point projection for engaging arm 23. The extreme left-hand end of the bore 11, as seen in FIG. 2, is closed by a cap 19 merely for the protection of the parts therein inasmuch as no liquid reaches that end of the bore.

A shaft 20 is journaled in the body 10 on an axis at right angles to the axis of the piston 15 and offset therefrom at the other side of the metal body. Preferably, the opposite ends of this shaft are of slightly smaller diameter as indicated at 20a and an annular series of needle bearings 21 is provided around each end of the shaft rotatably supporting the shaft in the bore 22 in a substantially frictionless manner. The aforementioned arm 23 has its one end secured within the medial portion of the shaft 20 extending crosswise thereof and radially away therefrom so that its distal end lies opposite the projection 18. A simple manner of forming this arm is to provide a cylindrical bore cross-wise of the arm and then provide an arm 23 having an end 23a of slightly reduced diameter which is a press fit in the bore cross-wise of shaft 20. For accurate operation of the gage, the area at the distal end of shaft 23 opposite the projection 18 is flattened and hardened as indicated at 23b. The block 10 is cut away as indicated at 24 around the shaft 23 giving a clearance between the bores 11 and 22 for the slight movement of the arm 23 in the use of my improved gage. The shaft 20 is held assembled in the body 10 by means of small plates 25 on opposite sides of the body secured thereto by screws 28.

Means is provided for attaching a driving member to at least one end of shaft 20. Preferably such means is provided at both ends of the shaft as shown in the accompanying drawings so that with one end presented to the driving member, a left-hand drive may be obtained while with the other end up a right-hand drive may be utilized. In the present form of the invention, hex heads 26 are provided coaxial with and integral with shaft 20. Other arrangements are possible, one obvious one being non-circular sockets in the ends of shaft 20 rather than the projecting non-circular members 26.

Some means for the attachment of the block 10 in a position to be held firmly while driving means is applied at the member 26 is desirable. That is the purpose of the through openings 27 which are provided for the purpose of bolting down the block 10 when necessary.

One use of my improved gage is in the checking of a nut runner which provides an air driven member coaxial with the shaft 20 which is used for driving nuts on proper receiving bolts, the nuts being driven until the air driven nut runner stalls. My improved device may be bolted in position on the machine so that the block 10 is held with member 26 in line with the nut runner. The nut runner is then operated until it stalls and the foot pounds of torque are read on the gage 14. The air pressure is then adjusted so that the stalling point gives the desirable foot pounds of torque. Because of the small dimensions of my device, I have been able to utilize six of these devices for checking a multiple spindle nut runner adapted for operating on six bolts placed at 2%6 inch centers. One or more of my gages is utilized to check this machine every morning to be sure that the air pressure used will stall the device when the desired foot pounds of torque have been exerted on the nuts driven by the nut runner.

In this device, the arcuate movement of arm 23 around the center of shaft 20 is approximately ½ of one degree when the gage 14 registers 30 foot pounds of troque. During such movement of arm 23, the relative movement between the point projection on ball 18 and the flat surface 23 is approximately 0.00009 inch. Thus, it will be seen that there is practically no sliding frictional movement between said surfaces defining the aforementioned point contact during the operation of my device and, therefore, it reads with very great accuracy.

It is obvious that the projection 18 might be a fixed hardened and ground sharp point, the ball 18 being rotatable increases the useful life of my device.

What is claimed is:

1. A stack torque measuring device comprising a body having means forming a chamber therein, a single-acting piston reciprocatable in said chamber and having means in sealing engagement with contiguous walls of said chamber, there being an opening in said chamber on the pressure side of said piston for connection with a pressure gage, said piston having a point projection extending centrally outwardly from the end thereof remote to said opening, a substantially incompressible fluid in said chamber on said pressure side of the piston and in fluid circuit with said gage, means forming a bore in said body said bore being spaced laterally from said chamber with its axis substantially perpendicular to the axis of said piston, a shaft journalled in said bore, means on each end of said shaft for selectively coaxially attaching a driving member thereto, channel means in said body communicating with said chamber and said bore, an arm rigidly connected to the medial portion of said shaft extending radially outwardly therefrom and through said channel means and having a distal end extending into said chamber, a substantially flat surface formed on said distal end and in engagement with said projection, said shaft being selectively rotatably driven from its one end by said driving member in one direction and from its other end in the opposite direction to move said arm and force said piston toward said opening.

2. A static torque measuring device as defined in claim 1 and wherein the point projection on the remote end of the piston comprises a ball partially embedded centrally in said latter end of said piston and extending outwardly thereof and into engagement with the flat surface on said distal end of the arm.

References Cited in the file of this patent
UNITED STATES PATENTS

| | | |
|---|---|---|
| 1,258,582 | McGuffey | Mar. 5, 1918 |
| 1,817,315 | Knapp | Aug. 4, 1931 |
| 2,190,967 | Zimmerman | Feb. 20, 1940 |
| 2,191,725 | Pepperdine | Feb. 27, 1940 |
| 2,443,049 | McVey | June 8, 1948 |